US012609408B2

(12) United States Patent  
Sasaki

(10) Patent No.: US 12,609,408 B2  
(45) Date of Patent: Apr. 21, 2026

(54) VALVE DEVICE AND ASSEMBLED BATTERY

(71) Applicant: DAI NIPPON PRINTING CO., LTD., Tokyo (JP)

(72) Inventor: Miho Sasaki, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 100 days.

(21) Appl. No.: 17/417,949

(22) PCT Filed: Dec. 26, 2019

(86) PCT No.: PCT/JP2019/051047  
§ 371 (c)(1),  
(2) Date: Jun. 24, 2021

(87) PCT Pub. No.: WO2020/138254  
PCT Pub. Date: Jul. 2, 2020

(65) Prior Publication Data  
US 2022/0077538 A1    Mar. 10, 2022

(30) Foreign Application Priority Data

Dec. 26, 2018    (JP) ................................. 2018-242470

(51) Int. Cl.  
*H01M 50/35*    (2021.01)  
*H01M 50/105*    (2021.01)  
(Continued)

(52) U.S. Cl.  
CPC ......... *H01M 50/35* (2021.01); *H01M 50/105* (2021.01); *H01M 50/129* (2021.01); *H01M 50/211* (2021.01); *H01M 50/308* (2021.01)

(58) Field of Classification Search  
CPC .. H01M 50/35; H01M 50/105; H01M 50/211; H01M 50/308; H01M 50/129; H01M 50/375  
See application file for complete search history.

(56) References Cited

U.S. PATENT DOCUMENTS 2,232,279 A    2/1941    Snyder  
5,876,872 A    3/1999    Feezor  
(Continued)

FOREIGN PATENT DOCUMENTS

CN    103597631 A    2/2014  
JP    2004-006213 A    1/2004  
(Continued)

OTHER PUBLICATIONS

Machine translation of WO2015160134A1 (Year: 2023).*  
(Continued)

*Primary Examiner* — Tong Guo  
*Assistant Examiner* — Albert Michael Hilton  
(74) *Attorney, Agent, or Firm* — Oliff PLC

(57)    ABSTRACT

A valve device and an assembled battery according to which even if the valve device operates, deterioration of an outer layer of a storage body is unlikely to be accelerated. The valve device is attached to a first storage body that stores a battery. The valve device includes an attachment part, a valve device main body, and a gas passage part. The attachment part is attached to the first storage body. The valve device main body reduces pressure inside the first storage body in a case where the pressure increases due to gas produced inside the first storage body. The gas passage part is between the attachment part and the valve device main body, and allows gas that passes through the attachment part to pass through the valve device main body. The (Continued)

valve device main body is located outward of an outer periphery of the first storage body.

18 Claims, 5 Drawing Sheets

(51) Int. Cl.
$$H01M\ 50/129 \qquad (2021.01)$$
$$H01M\ 50/211 \qquad (2021.01)$$
$$H01M\ 50/308 \qquad (2021.01)$$

(56) References Cited

U.S. PATENT DOCUMENTS

| | | | |
|---|---|---|---|
| 2005/0151514 A1 | 7/2005 | Kozu et al. | |
| 2009/0081542 A1 | 3/2009 | Yageta et al. | |
| 2013/0342168 A1* | 12/2013 | Okumura | H02J 7/0068 |
| | | | 320/167 |
| 2014/0120387 A1 | 5/2014 | Kinuta et al. | |
| 2015/0171406 A1* | 6/2015 | Bazzarella | H01M 10/0413 |
| | | | 429/158 |
| 2016/0036024 A1* | 2/2016 | Choi | H01M 50/105 |
| | | | 429/54 |
| 2017/0018748 A1 | 1/2017 | Matsuura | |

FOREIGN PATENT DOCUMENTS

| | | | |
|---|---|---|---|
| JP | 2006-202560 | A | 8/2006 |
| JP | 2008-117756 | A | 5/2008 |
| JP | 2011-070871 | A | 4/2011 |
| JP | 2011-175844 | A | 9/2011 |
| JP | 2014-75251 | A | 4/2014 |
| JP | 2015-18706 | A | 1/2015 |
| JP | 2015-46354 | A | 3/2015 |
| JP | 2017-91950 | A | 5/2017 |
| KR | 10-2015-0118781 | A | 10/2015 |
| WO | 2015/160134 | A1 | 10/2015 |

OTHER PUBLICATIONS

Dec. 19, 2022 Partial Supplementary European Search Report Issued in European Patent Application No. 19904227.6.

Mar. 1, 2023 Search Report issued in European Patent Application No. 19904227.6.

Mar. 10, 2020 International Search Report issued in International Patent Application No. PCT/JP2019/051047.

Oct. 30, 2024 Office Action issued in Korean Application No. 10-2021-7007978.

* cited by examiner

VALVE DEVICE AND ASSEMBLED BATTERY

TECHNICAL FIELD

The present invention relates to a valve device and an assembled battery.

BACKGROUND ART

JP 2004-6213A (Patent Literature 1) discloses a battery pack provided with a safety valve. In this battery pack, when an internal power generation element produces gas and an internal pressure increases, the gas is released from the safety valve. Accordingly, with this battery pack, even if the internal pressure increases due to gas produced by the power generation element, the internal pressure can be reduced (see Patent Literature 1).

CITATION LIST

Patent Literature

Patent Literature 1: JP 2004-6213A

SUMMARY OF INVENTION

Technical Problem

In the battery pack disclosed in the above-described Patent Literature 1, the safety valve (valve device) is formed on a sealing plate for sealing an open end of a battery can. Accordingly, if pressure inside the battery pack increases and the valve device operates, there is a high possibility that the gas released from the valve device will contact a side face of the battery pack. When the gas released from the valve device contacts the side face of the battery pack, deterioration of an outer layer of a storage body that stores a battery is promoted. Further, all of the surrounding members and instruments deteriorate as well.

The present invention has been made in order to solve such problems and an object of the present invention is to provide a valve device and an assembled battery, according to which deterioration of an outer layer of a storage body is unlikely to be accelerated even when the valve device operates.

Solution to Problem

A valve device according to an aspect of the present invention is to be attached to a first storage body for storing a battery. The valve device includes an attachment part, a valve device main body, and a gas passage part. The attachment part is configured to be attached to the first storage body. The valve device main body is configured to reduce pressure inside the first storage body in a case where the pressure increases due to gas produced inside the first storage body. The gas passage part is provided between the attachment part and the valve device main body, and is configured to allow gas that passes through the attachment part to pass through the valve device main body. In a case where the valve device is attached to the first storage body, the valve device main body is located outward of an outer periphery of the first storage body.

In the case where this valve device is attached to the first storage body, the valve device main body is located outward of the outer periphery of the first storage body. In other words, even if the valve device operates in the case where this valve device is attached to the first storage body, the gas is released at a position away from the first storage body. Accordingly, with this valve device, the gas released from the valve device main body is unlikely to contact the outer layer of the first storage body, and thus deterioration of the outer layer of the first storage body can be suppressed.

In the above-described valve device, a length of the gas passage part may also be 10 mm or more.

In the above-described valve device, the gas passage part may also be flexible in a length direction.

In the above-described valve device, the gas passage part may also be configured to hold a drying agent thereinside.

There is a possibility that moisture vapor will penetrate into the first storage body through a minute gap in the valve device main body. According to this valve device, since the drying agent is held inside the gas passage part, even if moisture vapor penetrates into the valve device main body, the influence of the penetration of moisture vapor into the gas passage part can be reduced.

In the above-described valve device, in a case where an assembled battery is constituted by storing a plurality of the first storage bodies in a second storage body, the valve device main body may also be located outward of an outer periphery of the second storage body.

In the case where the valve device is attached to the first storage body and the first storage body is stored in the second storage body, the valve device main body is located outward of the outer periphery of the second storage body. In other words, even if the valve device operates in this case, gas is released at a position away from the second storage body. Thus, according to this valve device, since the gas is released to the outside of the second storage body, a situation in which the second storage body is filled with gas and the outer layer of the first storage body is deteriorated can be suppressed.

In the above-described valve device, in a 25° C. environment, an amount of helium leakage from a secondary side of the valve device to a primary side that is measured compliant with a method defined in "vacuum splay method (splay method)" of JIS Z2331: 2006 "Method for Helium Leakage Testing" may also be at least $5.0 \times 10^{-11}$ Pa·m$^3$/sec and at most $5.0 \times 10^{-6}$ Pa·m$^3$/sec.

In the case where the sealability of the valve device is too high, a situation may occur in which the valve device does not function even if the pressure inside the first storage body increases, and the pressure inside the first storage body does not decrease. On the other hand, if the sealability of the valve device is too low, a situation may occur in which moisture vapor easily penetrates into the first storage body through a minute gap in the valve device main body. The inventor(s) of the present invention discovered that, if the amount of helium leakage of the valve device satisfies the above-described condition, gas produced inside the first storage body can be released to the outside and penetration of moisture vapor into the first storage body can be highly suppressed. Thus, according to this valve device, since the amount of helium leakage of the valve device satisfies the above-described condition, the gas produced inside the first storage body can be released to the outside, and penetration of moisture vapor into the first storage body can be highly suppressed.

A valve device according to another aspect of the present invention is to be attached to an assembled battery provided with storage bodies of a predetermined number that is two or more that each store a battery. The valve device includes a plurality of attachment parts, a valve device main body, and a plurality of gas passage parts. The attachment parts are each configured to be attached to a different one of the plurality of storage bodies. The valve device main body is configured to reduce pressure inside at least one of the storage bodies of the predetermined number in a case where the pressure increases due to gas produced inside the storage body. Each of the plurality of gas passage parts extends from a different one of the plurality of attachment parts and are each configured to allow gas that passes through the attachment part to pass through the valve device main body. In the case where the valve device is attached to the assembled battery, the valve device main body is located outward of an outer periphery of each of the plurality of storage bodies.

In the case where this valve device is attached to the assembled battery, the valve device main body is located outward of an outer periphery of each of the plurality of storage bodies. In other words, even if the valve device operates in the case where the valve device is attached to the assembled battery, gas is released at a position away from the storage body. Thus, according to this valve device, since the gas released from the valve device main body is unlikely to contact the outer layer of the storage body, deterioration of the outer layer of the storage body can be suppressed.

Further, in this valve device, the plurality of gas passage parts are provided with only one valve device main body. Thus, according to this valve device, compared with a case in which each gas passage part is provided with one valve device main body, the number of the valve device main bodies can be reduced, and therefore the cost of the valve device in the assembled battery can be suppressed.

Further, in this valve device, the plurality of storage bodies are provided with only one valve device main body. Thus, according to this valve device, compared with a case in which each storage body is provided with the valve device main body, the possibility that moisture vapor will penetrate into the storage body through a minute gap in the valve device main body can be reduced.

An assembled battery according to another aspect of the present invention includes a plurality of storage bodies and the valve device. The plurality of storage bodies each stores a battery.

The valve device according to another aspect of the present invention is attached to an assembled battery provided with a plurality of storage bodies that each store a battery. The valve device is provided with a plurality of attachment parts and a valve device main body. Each of the plurality of attachment parts is configured to be attached to each of the plurality of storage bodies. The valve device main body communicates with the plurality of attachment parts, and is configured to reduce pressure inside the storage body when the pressure inside the storage body increases due to gas produced inside at least one of the plurality of storage bodies.

In this valve device, the plurality of attachment parts are provided with only one valve device main body. Thus, according to this valve device, compared with a case where each attachment part is provided with one valve device main body, the number of the valve device main bodies can be reduced, and therefore the cost of the valve device in the assembled battery can be suppressed.

Further, in this valve device, the plurality of storage bodies are provided with only one valve device main body. Thus, according to this valve device, compared with a case in which each of the plurality of storage bodies is provided with the valve device main body, the possibility that moisture vapor will penetrate into the storage body through a minute gap in the valve device main body can be reduced.

Advantageous Effects of Invention

According to the present invention, it is possible to provide a valve device and an assembled battery according to which deterioration of an outer layer of a storage body is unlikely to be accelerated even if the valve device operates.

DESCRIPTION OF EMBODIMENTS

Figure 1:
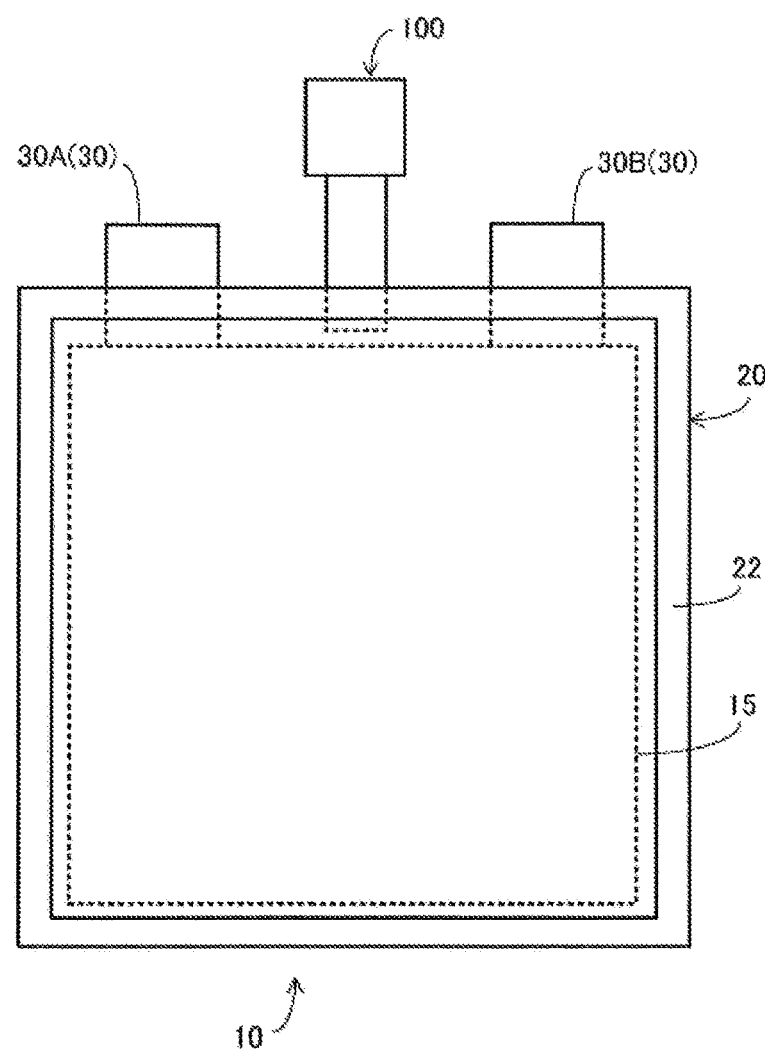
FIG. 1 is a plan view of a battery cell.

Hereinafter, embodiments of the present invention will be described in detail, with reference to the drawings. Note that the same reference signs are given to portions that are the same or equivalent in the drawings, and description thereof will not be repeated.

1. First Embodiment 1-1. Outline

Figure 2:
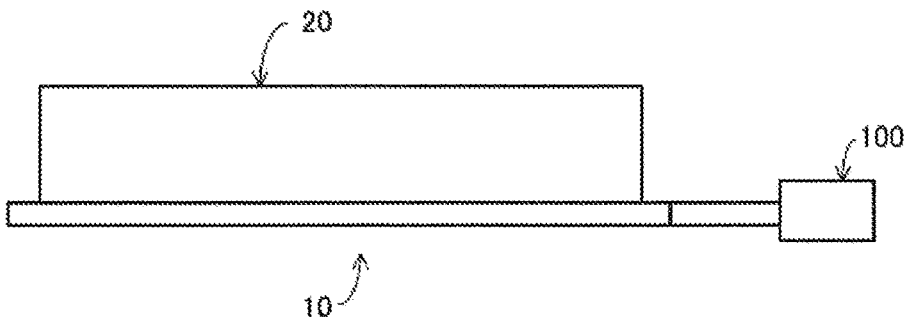
FIG. 2 is a side view of the battery cell.

FIG. 1 is a plan view of a battery cell 10 provided with a valve device 100 according to a first embodiment. FIG. 2 is a side view of the battery cell 10. Note that in FIG. 2, a portion (electrode tab 30) of the configuration is omitted in order to facilitate understanding the location of the valve device 100. The same applies to FIG. 5 and FIG. 6.

As shown in FIG. 1 and FIG. 2, the battery cell 10 includes a storage body 20, a battery device 15, electrode tabs 30A and 30B, and a valve device 100.

The storage body 20 is constituted by a laminate (laminated films) including a base material layer, a barrier layer, and a heat-sealable resin layer laminated in the stated order, and the shape may be a pouch type, or a molded type provided with a storage space that is formed by emboss processing or the like and capable of storing the battery device 15 therein. For example, the storage body 20 is constituted by two laminated films, and one laminate film is a molded part having a storage recess for storing the battery device 15, and the other laminate film is a kind of lid member that has no storage recess, and in the state where these two films are layered, the peripheral edges (sealed part 22) of the laminate films are heat-sealed. The storage body 20 is configured to store the battery device 15 therein in the state where the electrode tabs 30A and 30B and the valve device 100 are sandwiched at the peripheral edge. Note that, the storage body 20 formed by the laminate (laminated films) may also be formed by, preparing two molded parts that each include a storage recess, and heat-sealing the peripheral edge (sealed part 22) of the laminate films in the state where these two molded parts stacked, that is, in a so-called "doubled cup state" in which the storage volume is approximately doubled, or further, the storage body 20 need not necessarily be constituted by a laminate (laminated films), and, for example, may be formed by a can.

The battery device (battery element) 15 is a power storage member such as a lithium-ion battery or a capacitor. Note that the battery device 15 need not necessarily be a secondary battery, and a primary battery or a secondary battery may be stored in the storage body 20. Preferably, a secondary battery is stored in the storage body 20. The type of secondary battery to be stored in the storage body 20 is not particularly restricted, and a lithium-ion battery, a lithium-ion polymer battery, an all-solid battery, a lead battery, a nickel-hydride battery, a nickel-cadmium battery, a nickel-iron battery, a nickel-zinc battery, a silver oxide-zinc battery, a metal air cell, a polyvalent cation battery, a condenser and a capacitor are given as examples. When there is an abnormality in the battery device 15, gas may be produced in the storage body 20. Also, for example, if the battery device 15 is a capacitor, gas may be produced inside the storage body 20 due to a chemical reaction in the capacitor.

The electrode tabs 30 (30A and 30B) are metal terminals used for inputting/outputting power to/from the battery device 15. One end part of the electrode tabs 30 is electrically connected to an electrode (positive or negative electrode) of the battery device 15, and the other end part 25 protrudes outward from an end edge of the storage body 20.

Aluminum, nickel, and copper are given as the examples of the metal material constituting the electrode tabs 30. For example, if the battery device 15 is a lithium-ion battery, the electrode tab 30 to be connected to the positive electrode is usually constituted by aluminum or the like, and the electrode tab 30 to be connected to the negative electrode is usually constituted by copper, nickel, or the like. Note that, in the battery cell 10, the electrode tabs 30A and 30B are arranged on the same side, but the arrangement of the electrode tabs 30A and 30B is not limited to this. For example, the electrode tabs 30A and 30B may be respectively arranged on opposing sides of the battery cell 10.

The valve device 100 communicates with the inside of the storage body 20, and is configured to release gas inside the storage body 20 to the outside in the case where pressure inside the storage body 20 reaches a predetermined value or more due to gas produced inside the storage body 20. Note that, in the battery cell 10, the valve device 100 is arranged between the electrode tabs 30A and 30B, but the arrangement of the valve device 100 is not limited to this. For example, the valve device 100 may be arranged on a side on which neither the electrode tabs 30A nor 30B is provided.

If gas released from the valve device 100 continuously contacts the outer layer of the storage body 20, deterioration of the outer layer of the storage body 20 is accelerated. In the battery cell 10, the leading end part of the valve device 100 (valve device main body 110 (described later)) is located outward of the outer periphery of the storage body 20. In other words, even if the valve device 100 operates, the gas is released at a position away from the storage body 20. Thus, according to the valve device 100, since the released gas is unlikely to contact the storage body 20, deterioration of the outer layer of the storage body 20 can be suppressed. Hereinafter, the valve device 100 will be described in detail.

1-2. Configuration of Valve Device

Figure 3:
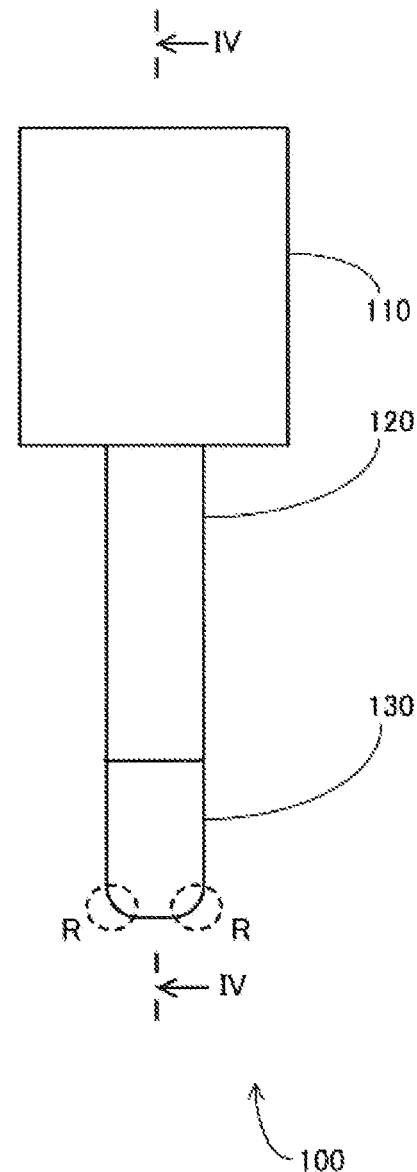
FIG. 3 is a plan view of a valve device.

FIG. 3 is a plan view of the valve device 100. As shown in FIG. 3, the valve device 100 includes a valve device main body 110, a gas passage part 120, and an attachment part 130. The valve device main body 110, the gas passage part 120, and the attachment part 130 may be formed in one piece or separately. For example, if these parts are formed separately, different materials can be selected as the materials of the parts.

The valve device main body 110 is constituted by a material such as metal or resin, and includes a structure in which pressure inside the storage body 20 is reduced in the case where the pressure increases due to gas produced in the storage body 20 in the state where the valve device 100 is attached to the storage body 20 (FIGS. 1 and 2). The valve device main body 110 will be described in detail later.

The attachment part 130 is constituted by a material such as metal or resin, and is configured to be attached to the storage body 20. More specifically, the attachment part 130 is configured to be fixed to the storage body 20 by at least partially being sandwiched by the storage body 20. In the state where the valve device 100 is attached to the storage body 20, in the attachment part 130, the outer peripheral face of the attachment part 130 and a heat-sealable resin layer, which is the innermost layer of the storage body 20, are joined by being fused together. For example, if the attachment part 130 is constituted by metal, an adhesive member that adheres both metal and resin may be arranged between the heat-sealable resin layer of the storage body 20 and the attachment part 130. The adhesive strength between the attachment part 130 and the storage body 20 is a strength at which adhesion between the valve device 100 and the storage body 20 is not released even if pressure inside the storage body 20 reaches the pressure at which a valve mechanism (e.g., return valve, breaker valve, and permselective valve) included in the valve device 100 opens.

In the attachment part 130, an R (e.g., R=0.2 mm to 2.0 mm) is formed at each corner of the end part on the opposite side to the gas passage part 120. Note that the Rs need not be necessarily formed. Note that, in the specification of the present application, the state in which a corner is rounded is referred to as "an R is formed". Here, "an R is formed" means the state in which a corner is rounded, which is structurally similar to the state in which a corner is chamfered, and, further, "R" by itself is used to mean a radius of the corner. Note that, if the attachment part 130 is made of metal, it is possible to chamfer to round off (form Rs) sharp corners produced in the manufacturing process of the attachment part 130 of the valve device 100, but if the attachment part 130 is a resin molded component, it is possible to form Rs without chamfering such as cutting, by molding the attachment part 130 so as to have rounded corners from the beginning.

The gas passage part 120 is constituted by a member such as a metal pipe or a resin pipe. The gas passage part 120 is provided between the attachment part 130 and the valve device main body 110, and is configured to allow gas that passes through the attachment part 130 to pass through the valve device main body 110. The longitudinal length of the gas passage part 120 is 10 mm or more, for example. By ensuring the longitudinal length of the gas passage part 120, in the case where the valve device 100 is attached to the storage body 20, the location of the valve device main body 110 will be outward of the outer periphery of the storage body 20.

Figure 4:
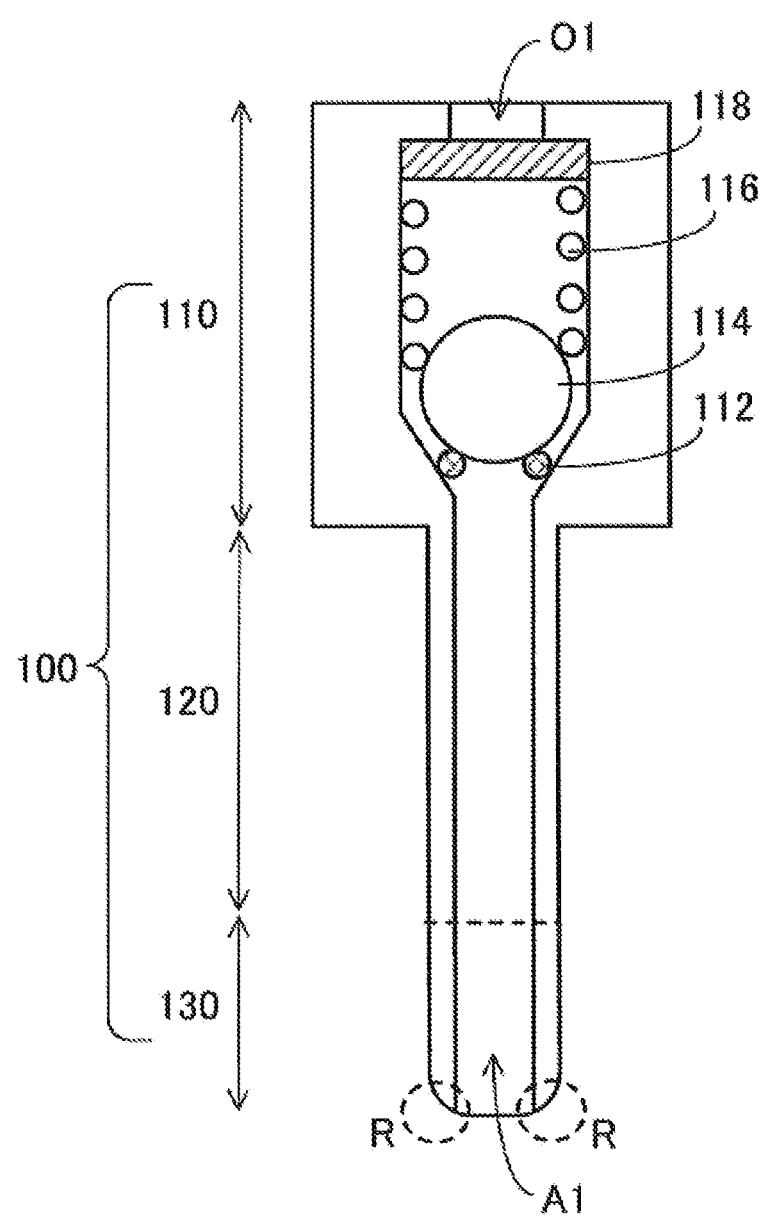
FIG. 4 is a cross-sectional view taken along line IV-IV in FIG. 3.

FIG. 4 is a cross-sectional view taken along line IV-IV in FIG. 3. As shown in FIG. 4, the Rs (e.g., R=0.2 mm to 2.0 mm) are formed at an end part of the attachment part 130 on the side opposite to the gas passage part 120. Note that the Rs need not necessarily be formed. Also, a ventilation passage A1 is formed inside the gas passage part 120 and the attachment part 130. A hole that is continuous with the ventilation passage A1 is formed in an end face of the attachment part 130 that is arranged inside the storage body 20. The ventilation passage A1 directs gas produced inside the storage body 20 to the valve device main body 110, for example.

A valve mechanism configured to exhaust gas produced inside the storage body 20 in the case where the valve device 100 is attached to the storage body 20 is provided inside the valve device main body 110. Specifically, the valve device main body 110 includes valve seats 112, a ball 114, springs 116, and a membrane 118. That is, a ball spring type valve mechanism (check valve) is provided in the valve device main body 110. Note that, the valve mechanism provided inside the valve device main body 110 is not particularly restricted as long as pressure inside the storage body 20 that has increased due to gas can be reduced, and may, for example, be a poppet valve mechanism, a duckbill valve mechanism, an umbrella valve mechanism, or a diaphragm valve mechanism. Also, the ball 114 need not necessarily be spherical, and may, for example, be hemispherical, prolate-spherical or oblate-spherical. Also, for example, in the case where the ball 114 is hemispherical, a columnar member may extend from the flat surface.

The valve seats 112 are each constituted by an O-ring, for example. The O-ring is a hollow circular ring, and is constituted by fluorocarbon rubber, for example. The ball 114 and the springs 116 are each constituted by stainless steel, for example. Note that the ball 114 may be constituted by resin.

The membrane 118 for example, has a pore diameter of $10^{-2}$ to $10^{0}$ μm, and is constituted by a PTFE (Poly Tetra Fluoro Ethylene) membrane that is only gas permeable (permselective) and does not leak electrolyte. The PTFE membrane is a soft material, and thus, in the case where strength is insufficient, a PTFE membrane reinforced by integral molding with a nonwoven fabric, or a mesh made of polypropylene or polyester can also be used as the membrane 118.

When pressure inside the storage body 20 reaches a predetermined pressure in a state where the valve device 100 is attached to the storage body 20, gas directed through the ventilation passage A1 pushes the ball 114 to a ventilation port O1 side. When the ball 114 is pushed and the springs 116 contract, the gas inside the storage body 20 passes through the gap formed between the ball 114 and the valve seats 112, permeates through the membrane 118, and is exhausted to the outside of the storage body 20 through the ventilation port O1.

Note that, in the valve device 100, the diameter of the valve device main body 110 is longer than the diameters of the gas passage part 120 and the attachment part 130, but the relationship between the diameters of the parts is not limited to this. For example, the diameters of the valve device main body 110, the gas passage part 120, and the attachment part 130 may be the same.

1-3. Amount of Helium Leakage

As described above, the valve device 100 is configured to release gas inside the storage body 20 to the outside in the case where pressure inside the storage body 20 reaches a predetermined value or more due to gas produced inside the storage body 20. If sealability of the valve device 100 is excessively high, the valve device 100 may not function even if the pressure inside the storage body 20 reaches the predetermined value or more. On the other hand, if the sealability of the valve device 100 is excessively low, there is a high possibility that moisture vapor (moisture) will penetrate into the storage body 20 from the outside environment in a normal state (when pressure inside the storage body 20 is less than the predetermined value).

In the valve device 100 according to the present embodiment, both a high sealability of the valve device 100 and a high suppression of penetration of moisture vapor into the storage body 20 are achieved due to the amount of helium leakage of the valve device 100 being adjusted.

The inventor(s) found that both a high sealability of the valve device 100 and a high suppression of penetration of moisture vapor into the storage body 20 can be achieved in the case where the amount of helium leakage from a secondary side to a primary side of the valve device 100, which is measured compliant with the method defined in "Vacuum splay method (splay method)" of JIS Z2331: 2006 "Method for Helium Leakage Testing" in a 25° C. environment, is at least $5.0 \times 10^{-11}$ Pa·m$^3$/sec and at most $5.0 \times 10^{-6}$ Pa·m$^3$/sec. Accordingly, the amount of helium leakage of the valve device 100 is at least $5.0 \times 10^{-11}$ Pa·m$^3$/sec and at most $5.0 \times 10^{-6}$ Pa·m$^3$/sec when measured by the method defined in the above-described standard in a 25° C. environment. Note that the "secondary side" of the valve device 100 means the outside of the storage body 20 in the case where the valve device 100 is attached to the storage body 20. Also, the "primary side" of the valve device 100 means the inside of the storage body 20 in the case where the valve device 100 is attached to the storage body 20.

In the valve device 100, the upper limit of the amount of the helium leakage is preferably at most about $4.5 \times 10^{-6}$ Pa·m$^3$/sec, more preferably at most about $1.0 \times 10^{-6}$ Pa·m$^3$/sec, even more preferably at most about $1.0 \times 10^{-7}$ Pa·m$^3$/sec, further more preferably at most about $1.0 \times 10^{-8}$ Pa·m$^3$/sec, the lower limit is preferably at least $5.0 \times 10^{-11}$ Pa·m$^3$/sec, and a preferable range is about $5.0 \times 10^{-11}$ Pa·m$^3$/sec to $4.5 \times 10^{-6}$ Pa·m$^3$/sec, about $5.0 \times 10^{-11}$ Pa·m$^3$/sec to $1.0 \times 10^{-6}$ Pa·m$^3$/sec, about $5.0 \times 10^{-11}$ Pa·m$^3$/sec to $1.0 \times 10^{-7}$ Pa·m$^3$/sec, and about $5.0 \times 10^{-11}$ Pa·m$^3$/sec to $1.0 \times 10^{-8}$ Pa·m$^3$/sec.

Due to the amount of helium leakage satisfying the above-described upper limit, penetration of moisture vapor (moisture) into the storage body 20 from the outside environment can be highly suppressed. Also, due to the amount of helium leakage satisfying the above-described lower limit, gas can be released to the outside in the case where gas is produced inside the storage body 20. Note that, if the amount of helium leakage is too small, it is difficult to stably release gas produced inside the storage body 20 to the outside of the storage body 20. Also, if such a valve device is not opened for a long time and the battery cell is still being used, the possibility increases that the valve device will not be appropriately opened even in the case where the internal pressure increases to the design value.

Further, in the valve device 100, if the amount of helium leakage is set to the range of about $5.0 \times 10^{-11}$ Pa·m$^3$/sec to $2.0 \times 10^{-10}$ Pa·m$^3$/sec, or further about $5.0 \times 10^{-11}$ Pa·m$^3$/sec to $1.5 \times 10^{-10}$ Pa·m$^3$/sec, penetration of moisture vapor (moisture) into the storage body 20 from the outside environment can be particularly highly suppressed. In order to set such an amount of helium leakage, as described later, it is necessary to extremely accurately design and process a shape of a portion, at which the valve seat and the ball of the valve mechanism are contact with each other, to a high standard not previously demanded of conventional check valves.

Note that the helium leakage testing is performed according to the following method. Specifically, in the helium leakage testing, the amount of helium leakage of the valve device 100 from the secondary side to the primary side is measured compliant with the method defined in "Vacuum splay method (splay method)" of JIS Z2331: 2006 "Method for Helium Leakage Testing". Specifically, a helium leak detector is used as a testing device. Also, a gas valve (valve device main body 110) of the valve device 100 is placed on a jig for leakage testing (a jig confirmed to have no helium leakage in the case where a dummy valve device in which the gas valve is closed is installed) and placed on the helium leak detector via a test port. No helium leakage between the jig and the helium leakage detector is also confirmed. After that, the primary side of the valve device 100 is evacuated to the degree of 13 Pa, and helium gas of 99.99% is splayed from the secondary side of the valve device 100, and measurement is started. The evaluation result is recorded with the spray time being one to two seconds, and the standby time being two to four seconds. Note that, for confirmation, a method may also be performed in which the same valve device 100 is covered by a hood having a volume of 50 ml and left to stand for 20 seconds, compliant with the method defined in "Vacuum covering method (Vacuum hood method)" of JIS Z 2331:2006 "Method for Helium Leakage Testing" to confirm that the measuring result is the same. The measurement environment temperature is 25° C. in all cases.

With regard to the differential pressure (i.e., open pressure of the valve device 100) between the primary side and the secondary side of the valve device 100, the lower limit is preferably at least about 0.05 MPa, and more preferably at least about 0.1 MPa, and the upper limit is preferably at most about 1 MPa, and more preferably about 0.3 MPa, and preferable ranges are about 0.05 to 1 MPa, about 0.05 to 0.3 MPa, about 0.1 to 1 MPa, and about 0.1 to 0.3 MPa. Due to the differential pressure being satisfied, in the case where gas is produced inside the storage body 20, the gas can be favorably released to the outside, and penetration of moisture vapor (moisture) from the outside environment can be highly suppressed.

The set pressure inside the battery cell 10 (storage body 20) to which the valve device 100 is attached is preferably set to a predetermined pressure or less. The set value of the internal pressure is appropriately set according to the type of package equipped with the valve device, but preferably about 0.1 MPa or less, and more preferably at most about $1.0 \times 10^{-2}$ MPa, and the lower limit is, for example, at least about $1.0 \times 10^{-10}$ Mpa, and preferable ranges of the internal pressure are about $1.0 \times 10^{-10}$ to 0.1 MPa and about $1.0 \times 10^{-10}$ to $1.0 \times 10^{-2}$ MPa.

In the valve device 100, the amount of helium leakage can be set using a known method. For example, the amount of helium leakage can be adjusted by designing the material, shape, and size of the members (e.g., the ball 114, the valve seats 112, the springs 116, the ventilation port O1) constituting the valve device main body 110 (valve mechanism) of the valve device 100, and the force for pressing the ball 114 by the springs 116, and the like.

For example, an elastic body is used for one of the ball 114 and the valve seats 112 of the valve mechanism, and a super-hard material such as metal is used for the other thereof, and thus the amount of helium leakage can be easily set within the range of at least $5.0 \times 10^{-11}$ Pa·m/sec and at least $5.0 \times 10^{-6}$ Pa·m/sec. In order to reduce the amount of helium leakage, it is effective to use an elastic body for both the ball 114 and the valve seats 112 of the valve mechanism, but as described above, if the amount of helium leakage is excessively small, it becomes difficult to release gas produced inside the storage body 20 to the outside, and thus the material, shape, size, and the like of the members constituting the valve mechanism are adjusted as appropriate. For example, in the valve mechanism, if portions of the valve seats 112 that come in contact with the ball 114 each have a shape conforming to the shape of the surface of the ball 114, the amount of helium leakage is easily designed within the above-described range.

As such, in the valve device 100, in order to set the amount of helium leakage within the range of about $5.0 \times 10^{-11}$ Pa·m³/sec to $2.0 \times 10^{-10}$ Pa·m³/sec, or further, the range of about $5.0 \times 10^{-11}$ Pa·m³/sec to $1.5 \times 10^{-10}$ Pa·m³/sec, it is necessary to extremely accurately design and process a shape of a portion at which the valve seats 112 and the ball 114 of the valve mechanism to a high standard not previously demanded of conventional check valves. For example, it is effective to set the average surface roughness of the portions of the valve seats 112 that come in contact with the ball 114 and the surface of the ball 114 to 20 μm or less, preferably 5 μm or less, and more preferably 1 μm or less, and the like. Note that, if the members having excessively accurate surfaces are brought into contact with each other, a problem that the valve device 100 does not appropriately operate (the valve device main body 110 does not open) may occur, and thus the surface roughness need be adjusted such that the amount of helium leakage falls within the above-described range.

1-4. Configuration of Assembled Battery

Figure 5:
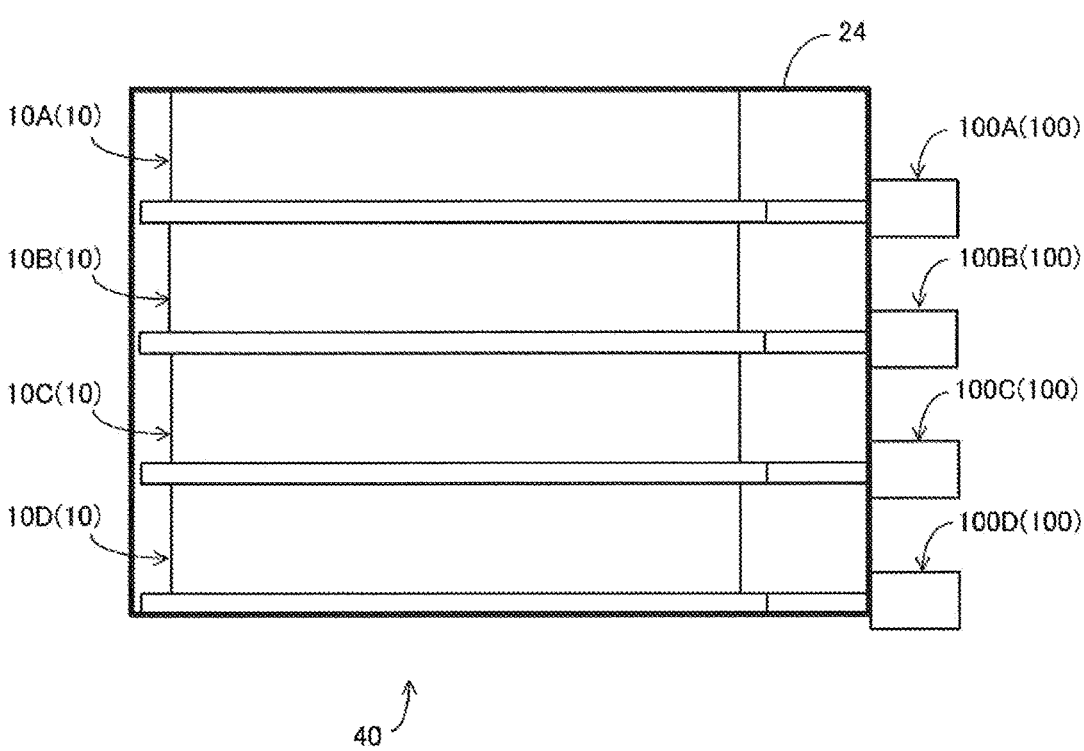
FIG. 5 is a side view of a battery module in which an outer covering is partially transparent.

FIG. 5 is a side view of a battery module 40 in which the outer covering is partially transparent. As shown in FIG. 5, the battery module 40 includes a plurality of battery cells 10 (10A, 10B, 10C, and 10D) and the outer covering pack 24.

The outer covering pack 24 is a case for storing the plurality of battery cells 10. The plurality of battery cells 10 are stacked in the outer covering pack 24. Holes through which the valve devices 100 of the battery cells 10 pass through are formed in the outer covering pack 24. At least the valve device main bodies 110 (FIG. 3 and FIG. 4) of the valve devices 100 protrude outward of the outer covering pack 24 through the holes. In other words, in the valve devices 100, the longitudinal length of the gas passage parts 120 is ensured to the extent that the valve device main bodies 110 are located outward of the outer periphery of the outer covering pack 24 when the battery module 40 is constituted by storing the stacked battery cells 10 (storage bodies 20) in the outer covering pack 24. Note that, in the outer covering pack 24, the battery cells 10 may be stacked so as to be laterally arranged side by side, the battery cells 10 may be stacked such that the battery cells 10 come in contact with each other, or may be stacked with members interposed between the battery cells 10.

In other words, even if any one of the valve devices 100 in the battery module 40 operates, gas released from the valve device 100 is released at a position away from the outer covering pack 24. Thus, according to the valve device 100, since gas is released to the outside of the outer covering pack 24, a case can be suppressed in which the outer covering pack 24 is filled with gas and the outer layer of the storage body 20 (FIG. 1 and FIG. 2) is deteriorated.

Also, in the valve devices 100, due to a certain length being ensured as the longitudinal length of the gas passage parts 120, there is a merit as follows. A case is assumed in which the thickness of the valve device main bodies 110 is larger than the thickness of the storage bodies 20. If the gas passage parts 120 are short or not provided in the valve devices 100, a case may occur in which, when the plurality of storage bodies 20 are stacked, the adjacent valve devices 100 come in contact with each other (the valve devices 100 become obstacles), and the storage bodies 20 cannot be stacked in the state of being contact with each other. In the valve devices 100 according to the present embodiment, the longitudinal length of the gas passage parts 120 is ensured to a certain extent. Accordingly, even if the plurality of storage bodies 20 are stacked in the case where the valve device main bodies 110 are thicker than the storage bodies 20, the valve devices 100 merely spread in a fan form, and the storage bodies 20 can still be stacked in the state of being in contact with each other.

1-5. Features

As described above, in the case where each valve device 100 according to the present embodiment is attached to each storage body 20, the leading end part (valve device main body 110) of the valve device 100 is located outward of the outer periphery of the storage body 20. In other words, even if the valve device 100 operates, gas released from the valve device 100 is released at a position away from the storage body 20. Thus, according to the valve device 100, since the released gas is unlikely to contact the storage body 20, deterioration of the outer layer of the storage body 20 can be suppressed.

2. Second Embodiment 2-1. Outline

In the above-described first embodiment, one valve device 100 is provided for one storage body 20. In this case, when the battery module 40 is constituted, valve devices 100 of the number of battery cells 10 (storage bodies 20) included in the battery module 40 are used. When the number of valve devices 100 increases, the possibility that moisture vapor (moisture) will penetrate into the primary side from the secondary side of the valve device 100 at normal time increases. In other words, the amount of moisture that penetrates into one battery cell 10 increases. Also, an increase in the number of valve devices 100 results in an increase in cost.

In the second embodiment, only one valve device is provided for the plurality of storage bodies (battery cells). In other words, in the second embodiment, one valve device is provided for one battery module.

Figure 6:
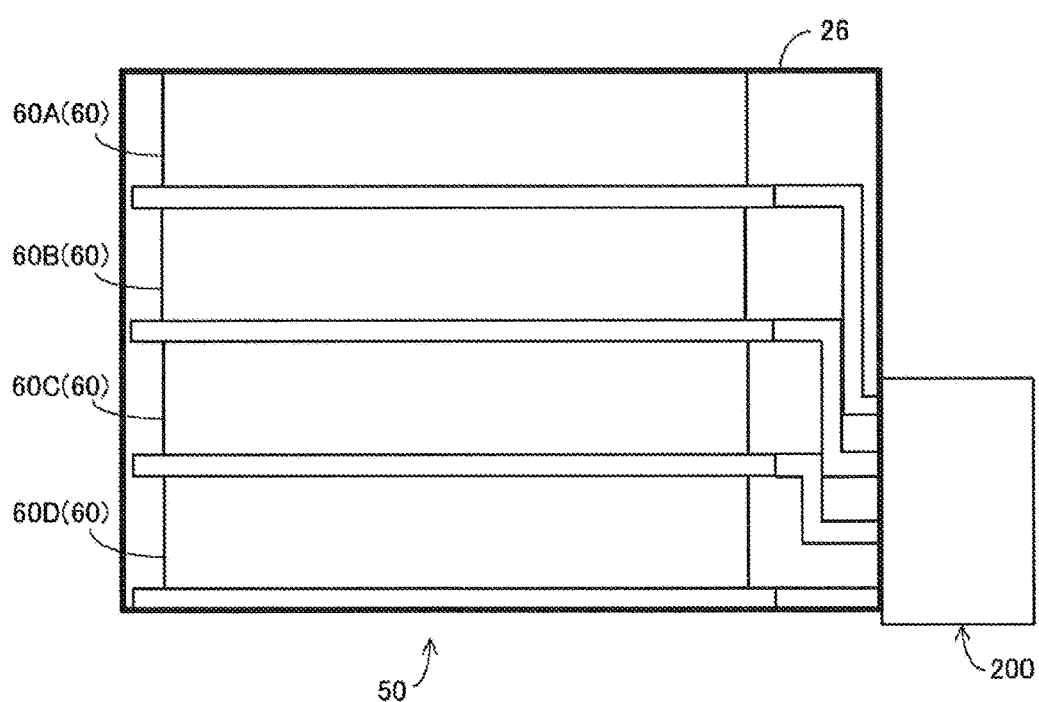
FIG. 6 is a side view of a battery module according to a second embodiment in which the outer covering is partially transparent.

FIG. 6 is a side view of a battery module 50 according to the second embodiment, in which the outer covering is partially transparent. As shown in FIG. 6, the battery module 50 includes a plurality of battery cells 60 (60A, 60B, 60C, and 60D) and an outer covering pack 26. In the battery module 50, only one valve device 200 is provided to the plurality of battery cells 60.

As such, according to the valve device 200, compared to the case where a valve device is provided for each of the plurality of battery cells 60, the number of the valve functional parts is reduced, and accordingly, the possibility that moisture vapor will penetrate into the battery cells 60 through a minute gap in the valve device can be reduced. In other words, the amount of moisture that penetrates into one battery cell 60 can be reduced. Further, according to the valve device 200, compared to the case where one valve device is provided for each of the battery cells 60, the number of valve devices is reduced, and accordingly, the cost of the valve device in the battery module 50 can be suppressed.

Further, in the battery module 50, the leading end part of the valve device 200 (valve device main body 210 (described later)) is located outward of the outer covering pack 26. In other words, even if the valve device 200 operates in the battery module 50, gas released from the valve device 200 is released at a position away from the outer covering pack 26. Thus, according to the valve device 200, since gas is released to the outside of the outer covering pack 26, a case can be suppressed in which the outer covering pack 26 is filled with gas and the outer layers of the storage bodies of the battery modules 60 are deteriorated. Hereinafter, the valve device 200 will be described in detail.

2-2. Configuration of Valve Device

Figure 7:
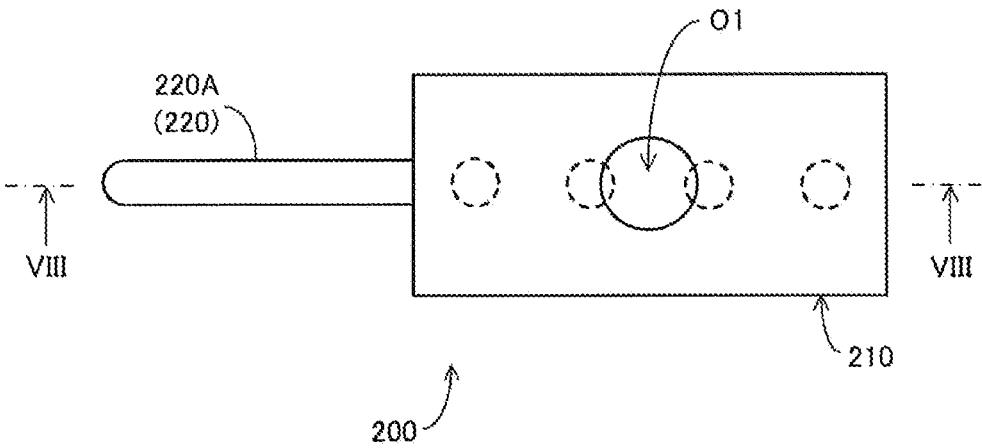
FIG. 7 is a top view of the valve device.
Figure 8:
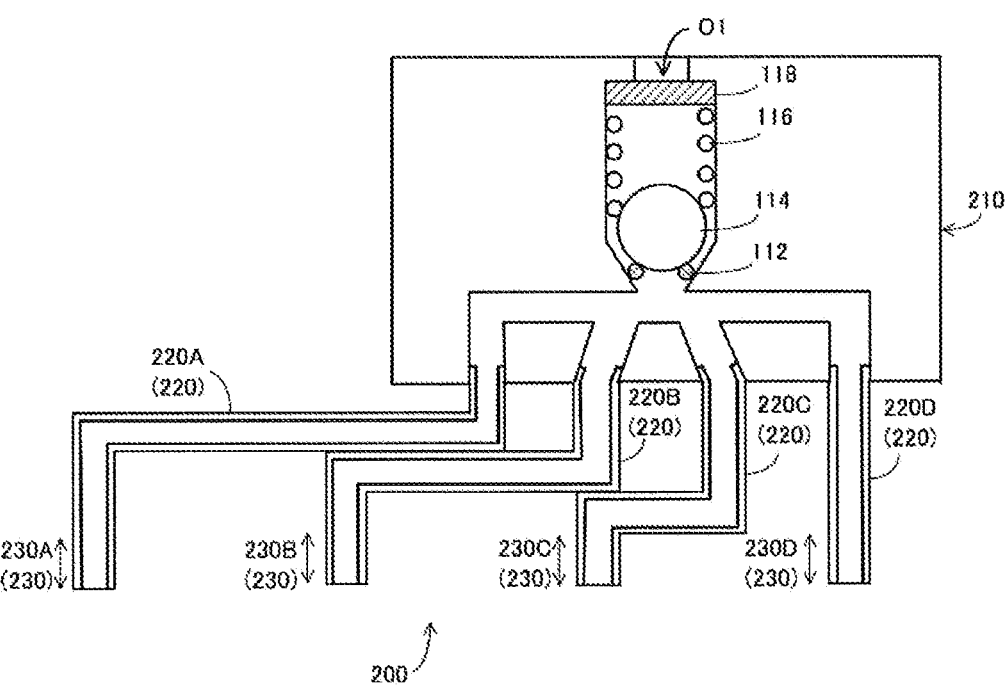
FIG. 8 is a cross-sectional view taken along line VIII-VIII in FIG. 7.

FIG. 7 is a top view of the valve device 200. FIG. 8 is a cross-sectional view taken along line VIII-VIII in FIG. 7. As shown in FIG. 7 and FIG. 8, the valve device 200 includes a valve device main body 210, gas passage parts 220A, 220B, 220C, and 220D, and attachment parts 230A, 230B, 230C, and 230D. The valve device main body 210, the gas passage parts 220A, 220B, 220C, and 220D, and the attachment parts 230A, 230B, 230C, and 230D may be constituted in one piece or separately. For example, if these parts are constituted separately, different materials can be selected as the materials for the parts.

The valve device main body 210 is formed from a material such as metal or resin. The valve device main body 210 includes a structure (the valve seats 112, the ball 114, the springs 116, the membrane 118, and the ventilation port O1) for reducing pressure inside the battery cell 60 in the case where the pressure increases due to gas produced inside the battery cell 60 in the state where the valve device 200 is attached to the battery cell 60 (storage body). This structure is similar to the first embodiment. As a difference from the first embodiment, a ventilation passage branches into two or more (four) at the lower part of the structure. The ventilation passages are continuous with the gas passage parts 220, and the gas passage parts 220 are continuous with the attachment parts 230. Note that the amount of helium leakage of the valve device main body 210 (valve device 200) is the same as the amount of helium leakage of the valve device 100 according to the first embodiment.

The attachment parts 230 are similar to the attachment parts 130 in the first embodiment. Also, the gas passage parts 220 are similar to the gas passage parts 120 in the first embodiment except that the shapes of the gas passage part 220 are different from that of the gas passage parts 120. The shapes of the gas passage parts 220 are appropriately set according to the position of the battery cell 60 to which each gas passage part 220 is to be attached in the battery module 50.

In the state where the valve device 200 is attached to the battery module 50, if pressure inside any one of the battery cells 60 reaches a predetermined pressure, gas guided through the attachment parts 230 and the gas passage parts 220 presses the ball 114 toward the ventilation port O1. When the ball 114 is pressed and the springs 116 contract, the gas inside the battery cell 60 passes through the gap formed between the ball 114 and the valve seats 112, permeates through the membrane 118, and exhausted from the ventilation port O1 to the outside of the battery cells 60 (battery module 50).

2-3. Features

As described above, the valve device 200 according to the second embodiment is attached to the battery module 50 constituted by stacking the plurality of storage bodies (battery cells 60) that each store a battery device.

In the valve device 200, only one valve device main body 210 is provided for the plurality of battery cells 60. Thus, according to the valve device 200, compared to the case where the valve device is provided for each of the plurality of battery cells 60, the possibility that moisture vapor will penetrate into the battery cells 60 (storage body) through a minute gap in the valve device main body 210 can be reduced.

Also, in the valve device 200, only one valve device main body 210 is provided for the plurality of gas passage parts 220. And thus, according to the valve device 200, compared to the case where one valve device main body is provided to each gas passage part 220, the number of valve device main bodies is reduced, and accordingly, the cost of the valve device in the battery module 50 can be suppressed.

3. Variations

Although the first and second embodiments have been described above, the present invention is not limited to the above-described first and second embodiments, and various changes can be made without departing from the gist of the invention. Hereinafter, variations will be described. Note that the following variations can be appropriately combined with each other.

3-1

In the first and second embodiments, the gas passage parts 120 and 220 were hollow. However, the inside of the gas passage parts 120 and 220 need not necessarily be hollow. For example, a drying agent such as silica may be held inside the gas passage parts 120 and 220. For example, the drying agent is held on the inner walls of the gas passage parts 120 and 220. In this case, if moisture vapor penetrates into the primary side from the secondary side of the valve devices 100 and 200, the influence of the water vapor can be reduced.

3-2

Also, the gas passage parts 120 and 220 in the first and second embodiments may be constituted by flexible tubes that are bendable and extendable. In this manner, the position at which gas is exhausted can be more flexibly adjusted.

3-3

Further, the gas passage parts 120 in the first embodiment need not necessarily be linear in shape, and may be L-shaped, for example.

3-4

Further, the position at which gas is released through the valve devices 100 and 200 can be controlled by appropriately setting the shapes and lengths of the gas passage parts 120 and 220 in the first and second embodiments.

REFERENCE SIGNS LIST

10, 10A, 10B, 10C, 10D, 60, 60A, 60B, 60C, 60D Battery cell (single battery)
15 Battery device
20 Storage body
22 Sealed part
24, 26 Outer covering pack
30, 30A, 30B Electrode tab
40, 50 Battery module (assembled battery)
100, 100A, 100B, 100C, 100D, 200 Valve device
110, 210 Valve device main body
112 Valve seat
114 Ball
116 Spring
118 Membrane
120, 220, 220A, 220B, 220C, 220D Gas passage part
130, 230, 230A, 230B, 230C, 230D Attachment part
A1 Ventilation passage
O1 Ventilation port

The invention claimed is:
1. A valve device to be attached to a first storage body for storing a battery, the valve device comprising:

one attachment part that is located on one end side of the valve device and is configured so that the valve device is attached to the first storage body at the attachment part;
one valve device main body that is configured to reduce pressure inside the first storage body where the pressure increases due to gas produced inside the first storage body, and is located on another end side of the valve device; and
one gas passage part that is provided between the attachment part and the valve device main body, and is configured to allow gas that passes through the attachment part to pass through the valve device main body, wherein
the valve device main body is located outward of an outer periphery of the first storage body,
an outer diameter of the valve device main body is larger than an outer diameter of the attachment part,
a corner of an end of the attachment part opposite the gas passage part is rounded,
the valve device has a straight exterior surface from the corner of the end of the attachment part to the valve device main body, and
a span across a circumference from the exterior surface from the corner of the end of the attachment part to the valve device main body is smaller than the valve device main body.
2. The valve device according to claim 1,
wherein a length of the gas passage part is 10 mm or more.
3. The valve device according to claim 2,
wherein an assembled battery is constituted by storing a plurality of the first storage bodies in a second storage body, and the valve device main body is located outward of an outer periphery of the second storage body.
4. The valve device according to claim 2,
wherein, in a 25° C. environment, an amount of helium leakage from a secondary side of the valve device to a primary side that is measured compliant with a method defined in "vacuum splay method (splay method)" of JIS Z2331: 2006 "Method for Helium Leakage Testing" is at least $5.0\times10^{-11}$ Pa·m$^3$/sec and at most $5.0\times10^{-6}$ Pa·m$^3$/sec.
5. The valve device according to claim 1,
wherein the gas passage part is configured to hold a drying agent thereinside.
6. The valve device according to claim 5,
wherein an assembled battery is constituted by storing a plurality of the first storage bodies in a second storage body, and the valve device main body is located outward of an outer periphery of the second storage body.
7. The valve device according to claim 5,
wherein, in a 25° C. environment, an amount of helium leakage from a secondary side of the valve device to a primary side that is measured compliant with a method defined in "vacuum splay method (splay method)" of JIS Z2331: 2006 "Method for Helium Leakage Testing" is at least $5.0\times10^{-11}$ Pa·m$^3$/sec and at most $5.0\times10^{-6}$ Pa·m$^3$/sec.
8. The valve device according to claim 1,
wherein an assembled battery is constituted by storing a plurality of the first storage bodies in a second storage body, and the valve device main body is located outward of an outer periphery of the second storage body.
9. The valve device according to claim 8,
wherein, in a 25° C. environment, an amount of helium leakage from a secondary side of the valve device to a primary side that is measured compliant with a method defined in "vacuum splay method (splay method)" of JIS Z2331: 2006 "Method for Helium Leakage Testing" is at least $5.0 \times 10^{-11}$ Pa·m$^3$/sec and at most $5.0 \times 10^{-6}$ Pa·m$^3$/sec.

10. The valve device according to claim 1, wherein, in a 25° C. environment, an amount of helium leakage from a secondary side of the valve device to a primary side that is measured compliant with a method defined in "vacuum splay method (splay method)" of JIS Z2331: 2006 "Method for Helium Leakage Testing" is at least $5.0 \times 10^{-11}$ Pa·m$^3$/sec and at most $5.0 \times 10^{-6}$ Pa·m$^3$/sec.

11. A battery comprising:

the valve device according to claim 1;

the battery; and the first storage body storing the battery, wherein the first storage body is constituted by a laminate film including heat-sealable resin layers, the valve device is attached to the first storage body by being sandwiched between the heat-sealable resin layers, the one attachment part is attached to the first storage body and is located on one end side of the valve device; and all of the valve device main body is located outward of an outer periphery of the first storage body.

12. A valve device to be attached to a first storage body for storing a battery, the valve device comprising:

one attachment part that is located on one end side of the valve device and is configured so that the valve device is attached to the first storage body at the attachment part;

one valve device main body that is configured to reduce pressure inside the first storage body where the pressure increases due to gas produced inside the first storage body, and is located on another end side of the valve device; and one gas passage part that is provided between the attachment part and the valve device main body, and is configured to allow gas that passes through the attachment part to pass through the valve device main body, wherein the valve device main body is located outward of an outer periphery of the first storage body, the gas passage part is constituted by a flexible tube, a corner of an end of the attachment part opposite the gas passage part is rounded, the valve device has a straight exterior surface from the corner of the end of the attachment part to the valve device main body, and a span across a circumference from the exterior surface from the corner of the end of the attachment part to the valve device main body is smaller than the valve device main body.

13. The valve device according to claim 12, wherein a length of the gas passage part is 10 mm or more.

14. The valve device according to claim 12, wherein an assembled battery is constituted by storing a plurality of the first storage bodies in a second storage body, and the valve device main body is located outward of an outer periphery of the second storage body.

15. The valve device according to claim 12, wherein, in a 25° C. environment, an amount of helium leakage from a secondary side of the valve device to a primary side that is measured compliant with a method defined in "vacuum splay method (splay method)" of JIS Z2331: 2006 "Method for Helium Leakage Testing" is at least $5.0 \times 10^{-11}$ Pa·m$^3$/sec and at most $5.0 \times 10^{-6}$ Pa·m$^3$/sec.

16. A battery comprising:

the valve device according to claim 12;

the battery; and the first storage body storing the battery, wherein the first storage body is constituted by a laminate film including heat-sealable resin layers, the valve device is attached to the first storage body by being sandwiched between the heat-sealable resin layers, the attachment part is attached to the first storage body and is located on one end side of the valve device, and all of the valve device main body is located outward of an outer periphery of the first storage body.

17. A valve device to be attached to an assembled battery provided with storage bodies of a predetermined number that is two or more that each store a battery, the valve device comprising:

attachment parts of the predetermined number that are each configured to be attached to a different one of the storage bodies of the predetermined number, and are located on one end side of the valve device;

one valve device main body including a valve mechanism that is configured to reduce pressure inside at least one of the storage bodies of the predetermined number where the pressure increases due to gas produced inside the storage body, and is located on another end side of the valve device; and gas passage parts of the predetermined number that each extend from a different one of the attachment parts of the predetermined number and are each configured to allow gas that passes through the attachment part to pass through the valve device main body; wherein the valve device main body includes a number of internal passages equal to the predetermined number of the gas passage parts, the internal passages converge to communicate with the valve mechanism, a respective one of the attachment parts on the one end side of the valve device is configured to be attached to each of the storage bodies of the predetermined number, one of the gas passage parts extends from each of the attachment parts of the predetermined number, all of the valve device main body is located outward of an outer periphery of each of the storage bodies of the predetermined number, and a valve mechanism is not provided to each of the attachment parts of the predetermined number or the gas passage parts of the predetermined number.

18. An assembled battery comprising:

storage bodies of the predetermined number that each store a battery, and the valve device according to claim 17.

* * * * *